US012118580B2

(12) United States Patent
Kim et al.

(10) Patent No.: US 12,118,580 B2
(45) Date of Patent: Oct. 15, 2024

(54) METHODS, APPARATUSES, AND NON-TRANSITORY COMPUTER-READABLE RECORD MEDIA FOR REWARD ON CRYPTOCURRENCY EXCHANGE

(71) Applicant: LY Corporation, Tokyo (JP)

(72) Inventors: Yooho Kim, Seongnam-si (KR); Jisun Ha, Seongnam-si (KR); Hyeonji Kim, Seongnam-si (KR)

(73) Assignee: LY CORPORATION, Tokyo (JP)

( * ) Notice: Subject to any disclaimer, the term of this patent is extended or adjusted under 35 U.S.C. 154(b) by 0 days.

(21) Appl. No.: 17/734,409

(22) Filed: May 2, 2022

(65) Prior Publication Data

US 2022/0358532 A1 Nov. 10, 2022

(30) Foreign Application Priority Data

May 6, 2021 (KR) ........................ 10-2021-0058824

(51) Int. Cl.
*G06Q 30/02* (2023.01)
*G06Q 20/38* (2012.01)
*G06Q 30/0207* (2023.01)

(52) U.S. Cl.
CPC ....... *G06Q 30/0216* (2013.01); *G06Q 20/381* (2013.01); *G06Q 2220/00* (2013.01)

(58) Field of Classification Search
CPC ............. G06Q 30/0216; G06Q 20/381; G06Q 2220/00; G06Q 20/023; G06Q 20/065; G06Q 30/0234; G06Q 30/0211; G06Q 705/14; G06Q 30/0207–30/0277
See application file for complete search history.

(56) References Cited

U.S. PATENT DOCUMENTS

| 10,885,539 | B1* | 1/2021 | Purgatorio | ............ B60W 40/09 |
| 11,068,888 | B1* | 7/2021 | Levatte | ................ H04L 9/3239 |
| 11,151,527 | B2* | 10/2021 | Benkreira | ............ G06Q 20/381 |
| 11,308,556 | B2* | 4/2022 | Campbell | .............. G06Q 40/04 |
| 11,507,971 | B2* | 11/2022 | Harrison | ............ G06Q 30/0232 |
| 2007/0050183 | A1* | 3/2007 | Kao | ...................... G08G 1/0969 |
| | | | | 704/3 |
| 2010/0082445 | A1* | 4/2010 | Hodge | ................... G06Q 20/20 |
| | | | | 705/35 |
| 2014/0074452 | A1* | 3/2014 | Carmi | ...................... G06F 8/10 |
| | | | | 703/22 |

(Continued)

FOREIGN PATENT DOCUMENTS

KR   10-2019-0024601 A     3/2019
WO   WO 2020/130722 A1 *  12/2019

*Primary Examiner* — Thuy N Nguyen
(74) *Attorney, Agent, or Firm* — Harness, Dickey & Pierce, P.L.C.

(57) ABSTRACT

Disclosed are a method, a system, and a non-transitory computer-readable record medium for a reward on a cryptocurrency exchange. A cryptocurrency reward method includes determining a reward amount for a user that meets a reward condition in a cryptocurrency exchange, the reward amount being in a fiat currency, setting at least one cryptocurrency as at least one selected cryptocurrency based on a selection of the user, converting the reward amount into the at least one selected cryptocurrency to obtain at least one converted reward amount, and transferring the at least one converted reward amount to an account of the user.

14 Claims, 8 Drawing Sheets

(56) References Cited

U.S. PATENT DOCUMENTS

| | | | | |
|---|---|---|---|---|
| 2014/0189576 A1* | 7/2014 | Carmi | ................... | G06V 10/757 |
| | | | | 715/781 |
| 2014/0218385 A1* | 8/2014 | Carmi | ................... | G06V 10/25 |
| | | | | 345/620 |
| 2014/0274307 A1* | 9/2014 | Gonzalez | .............. | A63F 13/655 |
| | | | | 463/25 |
| 2017/0083897 A1* | 3/2017 | Sezgin | ................. | G06Q 20/326 |
| 2019/0156358 A1* | 5/2019 | Pace | ....................... | G06Q 10/06 |
| 2019/0236593 A1* | 8/2019 | Vorobyev | ............ | G06Q 20/3829 |
| 2019/0280792 A1* | 9/2019 | Jensen | ................. | G06Q 20/123 |
| 2019/0318424 A1* | 10/2019 | McWilliams | ........ | G06Q 20/227 |
| 2019/0325473 A1* | 10/2019 | Swamidurai | .............. | H04L 9/50 |
| 2020/0034869 A1* | 1/2020 | Harrison | ............ | G06Q 20/3678 |
| 2020/0051111 A1* | 2/2020 | Nelsen | ............... | G06Q 30/0216 |
| 2020/0065847 A1* | 2/2020 | Harrison | ............... | G06Q 20/341 |
| 2020/0070048 A1* | 3/2020 | Ishii | ....................... | A63F 13/795 |
| 2020/0242573 A1* | 7/2020 | Naqvi | ................... | G06Q 20/02 |
| 2020/0258152 A1* | 8/2020 | Naggar | ..................... | H04L 9/50 |
| 2020/0273002 A1* | 8/2020 | Regen | .................. | G06Q 20/204 |
| 2020/0286403 A1* | 9/2020 | Kaminski | ................. | G09B 7/02 |
| 2020/0294033 A1* | 9/2020 | Wilson | ............... | G06Q 20/0658 |
| 2020/0311699 A1* | 10/2020 | Ranjit | .............. | G06Q 20/38215 |
| 2020/0342531 A1* | 10/2020 | Pellini | ................ | G06Q 20/0655 |
| 2021/0174442 A1* | 6/2021 | Trudeau | ................. | H04L 9/3239 |
| 2021/0272077 A1* | 9/2021 | Hasegawa | ............. | G06Q 20/02 |
| 2021/0288791 A1* | 9/2021 | Sugiura | ................... | G06F 21/64 |
| 2021/0385311 A1* | 12/2021 | Kim | ....................... | G06F 1/1677 |
| 2022/0033077 A1* | 2/2022 | Myslinski | ............... | G06V 20/17 |
| 2022/0051219 A1* | 2/2022 | Sells | ......................... | H04L 9/50 |
| 2022/0051278 A1* | 2/2022 | Byun | .................... | G06Q 30/02 |
| 2022/0058681 A1* | 2/2022 | Garner | ............... | G06Q 30/0232 |
| 2022/0278966 A1* | 9/2022 | Glassco | ................ | H04W 12/041 |
| 2022/0284428 A1* | 9/2022 | Zhou | ....................... | G06Q 20/40 |
| 2022/0351288 A1* | 11/2022 | Britz | ................... | G06Q 20/3672 |
| 2023/0239704 A1* | 7/2023 | Tian | ....................... | H04W 16/14 |
| | | | | 370/329 |

* cited by examiner

METHODS, APPARATUSES, AND NON-TRANSITORY COMPUTER-READABLE RECORD MEDIA FOR REWARD ON CRYPTOCURRENCY EXCHANGE

CROSS-REFERENCE TO RELATED APPLICATION(S)

This U.S. non-provisional application claims the benefit of priority under 35 U.S.C. § 119 to Korean Patent Application No. 10-2021-0058824, filed May 6, 2021, the entire contents of which are incorporated herein by reference in their entirety.

BACKGROUND

Technical Field

Some example embodiments relate to technology for providing a reward, such as an investment return and an event participation benefit for cryptocurrency.

Related Art

Currently, with the advent of encryption technology, interest in cryptocurrencies based on encryption technology is significantly increasing.

A representative example of a cryptocurrency includes Bitcoin (BTC). In addition thereto, Link (LN), Ethereum (ETH), Ripple (XRP), Litecoin (LTC), DASH, EOS, and Bitcoin Cash (BCH), are leading the cryptocurrency market.

Unlike the general currency issued by a government or a central bank, such cryptocurrency is traded according to a regulation set by an original creator and distributed based on blockchain technology.

For example, technology is provided for trading a cryptocurrency using a private key provided to a uniform resource locator (URL). Also, a method is provided for authorizing trading through a server configured to verify transaction information for trading of a cryptocurrency having a blockchain, and confirming the trading based on whether the trading is authorized by a verification server.

SUMMARY

Some example embodiments may lower a risk to a budget while maintaining a reward value when providing a reward to a user in a cryptocurrency exchange.

Some example embodiments may provide a reward with a cryptocurrency desired by a user among various cryptocurrencies tradable in a cryptocurrency exchange.

According to an aspect of some example embodiments, there is provided a cryptocurrency reward method performed by a computer apparatus, the computer apparatus including at least one processor configured to execute computer-readable instructions stored in a memory, the cryptocurrency reward method includes determining, by the at least one processor, a reward amount for a user that meets a reward condition in a cryptocurrency exchange, the reward amount being in a fiat currency, setting, by the at least one processor, at least one cryptocurrency as at least one selected cryptocurrency based on a selection of the user, converting, by the at least one processor, the reward amount into the at least one selected cryptocurrency to obtain at least one converted reward amount, and transferring, by the at least one processor, the at least one converted reward amount to an account of the user.

The cryptocurrency reward method may further include placing, by the at least one processor, an order with a liquidity provider (LP) based on a quantity of the at least one selected cryptocurrency in a reward account being insufficient.

The cryptocurrency reward method may further include aggregating, by the at least one processor, a plurality of rewards to obtain an aggregated reward amount, and placing, by the at least one processor, an order with an LP corresponding to the aggregated reward amount based on a quantity of the at least one selected cryptocurrency in a reward account being insufficient.

The cryptocurrency reward method may further include setting, by the at least one processor, an order sequence of the aggregated reward amount based on a reward adjustment option and the at least one selected cryptocurrency.

The at least one selected cryptocurrency includes at least two selected cryptocurrencies, and the setting may include adjusting a reward ratio for each of the at least two selected cryptocurrencies.

The setting may include adjusting the reward ratio for each of the at least two selected cryptocurrencies based on a cryptocurrency-related internal standard.

The cryptocurrency-related internal standard includes a bug rate corresponding to a cryptocurrency price fluctuation.

The at least two selected cryptocurrencies include a first selected cryptocurrency, and the adjusting may include adjusting the reward ratio for the first selected cryptocurrency to zero based on a price fluctuation in the first selected cryptocurrency occurring a number of times or more within a reference time period.

The adjusting may include adjusting the reward ratio for each of the at least two selected cryptocurrencies based on a balance held in the cryptocurrency exchange.

The cryptocurrency reward method may further include providing, by the at least one processor, a reward payment notification using the at least one selected cryptocurrency through a chatroom associated with a messenger.

According to an aspect of some example embodiments, there is provided a non-transitory computer-readable record medium storing instructions that, when executed by at least one processor included in a computer apparatus, cause the computer apparatus to perform the cryptocurrency reward method.

According to an aspect of some example embodiments, there is provided a computer apparatus including at least one processor configured to execute computer-readable instructions stored in a memory to cause the computer apparatus to determine a reward amount for a user that meets a reward condition in a cryptocurrency exchange, the reward amount being in a fiat currency, set at least one cryptocurrency as at least one selected cryptocurrency based on a selection of the user, convert the reward amount into the at least one selected cryptocurrency to obtain at least one converted reward amount, and transfer the at least one converted reward amount to an account of the user.

Further areas of applicability will become apparent from the description provided herein. The description and specific examples in this summary are intended for purposes of illustration only and are not intended to limit the scope of the present disclosure.

DETAILED DESCRIPTION

Figure 1:
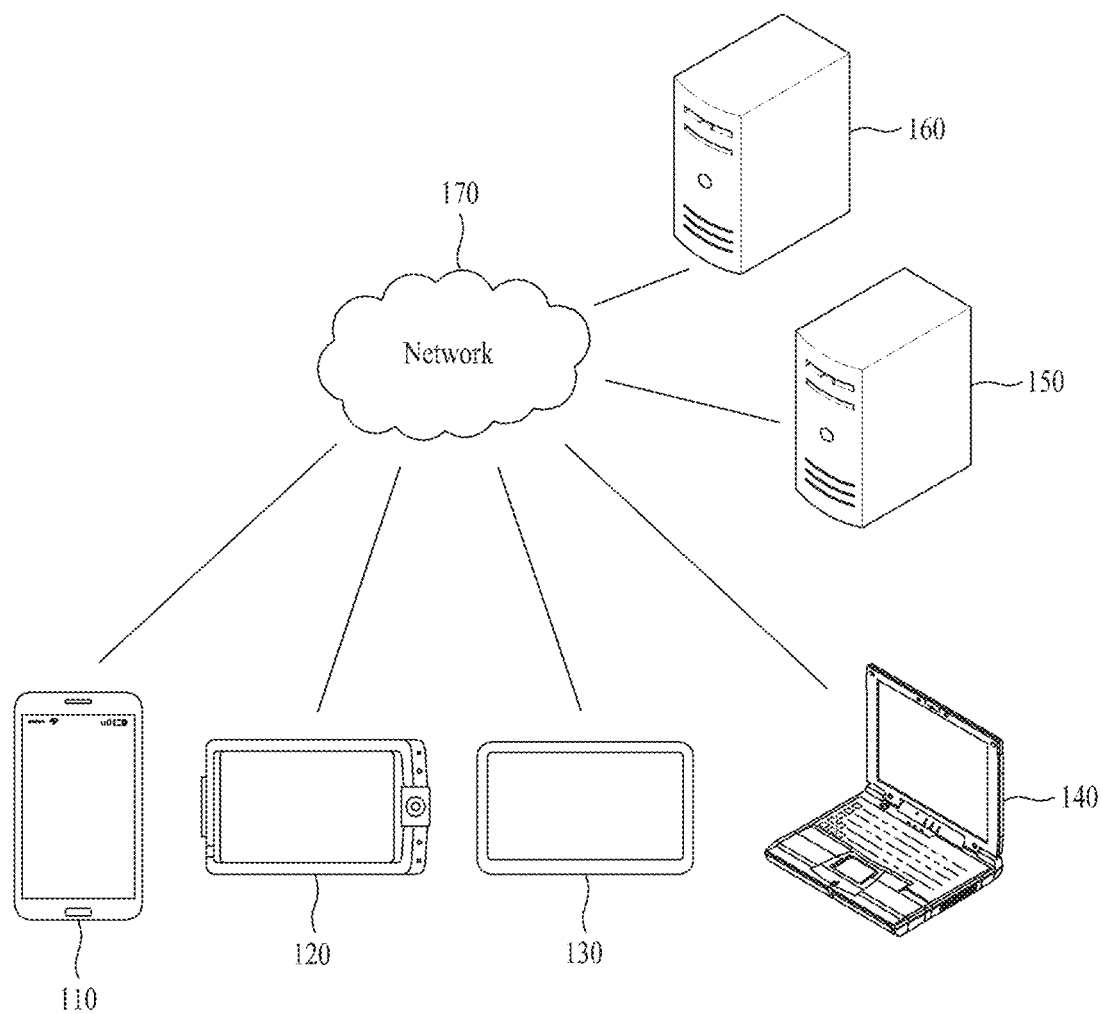
FIG. 1 is a diagram illustrating an example of a network environment according to some example embodiments.

Some example embodiments will be described in detail with reference to the accompanying drawings. Some example embodiments, however, may be embodied in various different forms, and should not be construed as being limited to only the illustrated examples. Rather, the illustrated examples are provided so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, operations, elements, and/or components, but do not preclude the presence or addition of one or more other features, integers, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

Unless otherwise defined, all terms (including technical and scientific terms) used herein have the same meaning as, or a similar meaning to, that commonly understood by one of ordinary skill in the art to which some example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

A hardware device, such as a computer processing device, may run an operating system (OS) and one or more software applications that run on the OS. The computer processing device also may access, store, manipulate, process, and create data in response to execution of the software. For simplicity, some example embodiments may provide for one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and/or substitutions of some example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, some example embodiments will be described with reference to the accompanying drawings.

Some example embodiments relate to technology for providing a reward, such as an investment return and an event participation benefit for cryptocurrency in a cryptocurrency exchange.

Some example embodiments including the disclosures herein may provide a cryptocurrency reward technology that may minimize or reduce a price fluctuation risk while maintaining a reward value for a user.

A cryptocurrency reward system according to some example embodiments may be implemented by at least one computer apparatus. A cryptocurrency reward method according to some example embodiments may be performed through at least one computer apparatus included in the cryptocurrency reward system. Here, a computer program may be installed and executed on the computer apparatus and the computer apparatus may perform the cryptocurrency reward method according to some example embodiments under control of the executed computer program. The aforementioned computer program may be stored in a non-transitory computer-readable record medium to computer-implement the cryptocurrency reward method in conjunction with the computer apparatus.

FIG. 1 illustrates an example of a network environment according to some example embodiments. Referring to FIG. 1, the network environment may include a plurality of electronic devices 110, 120, 130, and/or 140, a plurality of servers 150 and 160, and/or a network 170. FIG. 1 is provided as an example only. The number of electronic devices and/or the number of servers is not limited thereto. Also, the network environment of FIG. 1 is provided as an example of environments applicable to some example embodiments and an environment applicable to some example embodiments is not limited to the network environment of FIG. 1.

Each of the plurality of electronic devices 110, 120, 130, and/or 140 may be a fixed terminal or a mobile terminal that is configured as a computer apparatus. For example, the plurality of electronic devices 110, 120, 130, and/or 140 may be a smartphone, a mobile phone, a navigation device, a computer, a laptop computer, a digital broadcasting terminal, a personal digital assistant (PDA), a portable multimedia player (PMP), a tablet PC, and the like. For example, although FIG. 1 illustrates a shape of a smartphone as an example of the electronic device 110, the electronic device 110 used herein may refer to one of various types of physical computer apparatuses capable of communicating with other electronic devices 120, 130, and/or 140, and/or the servers 150 and 160, over the network 170 in a wireless and/or wired communication manner.

The communication scheme is not limited and may include a near field wireless communication scheme between devices as well as a communication scheme using a communication network (e.g., a mobile communication network, wired Internet, wireless Internet, a broadcasting network, a satellite network, etc.) includable in the network 170. For example, the network 170 may include at least one of network topologies that include a personal area network (PAN), a local area network (LAN), a campus area network (CAN), a metropolitan area network (MAN), a wide area network (WAN), a broadband network (BBN), the Internet, etc. Also, the network 170 may include at least one of network topologies that include a bus network, a star network, a ring network, a mesh network, a star-bus network, a tree or hierarchical network, and the like. However, these are provided as examples only.

Each of the servers 150 and 160 may be configured as a computer apparatus, or a plurality of computer apparatuses, that provides an instruction, a code, a file, content, a service, etc., through communication with the plurality of electronic devices 110, 120, 130, and/or 140 over the network 170. For example, the server 150 may be a system that provides a service, for example, a cryptocurrency trading service, to the plurality of electronic devices 110, 120, 130, and/or 140 connected over the network 170.

Figure 2:
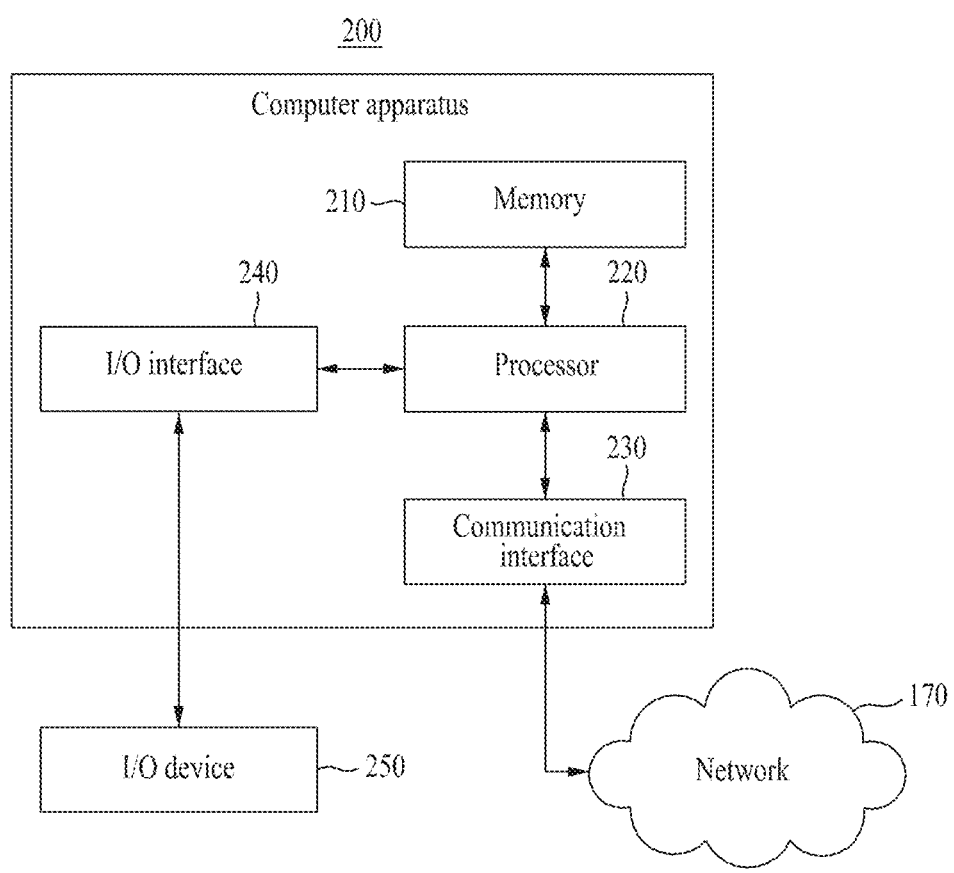
FIG. 2 is a diagram illustrating an example of a computer apparatus according to some example embodiments.

FIG. 2 is a block diagram illustrating an example of a computer apparatus according to some example embodiments. Each of the plurality of electronic devices 110, 120, 130, and/or 140, and/or the servers 150 and 160, may be implemented in a computer apparatus 200 of FIG. 2.

Referring to FIG. 2, the computer apparatus 200 may include a memory 210, a processor 220, a communication interface 230, and/or an input/output (I/O) interface 240. The memory 210 may include a permanent mass storage device, such as a random access memory (RAM), a read only memory (ROM), and/or a disk drive, as a non-transitory computer-readable record medium. The permanent mass storage device, such as ROM and disk drive, may be included in the computer apparatus 200 as a permanent storage device separate from the memory 210. Also, an OS and at least one program code may be stored in the memory 210. Such software components may be loaded to the memory 210 from another non-transitory computer-readable record medium separate from the memory 210. The other non-transitory computer-readable record medium may include, for example, a floppy drive, a disk, a tape, a DVD/CD-ROM drive, a memory card, etc. According to some example embodiments, software components may be loaded to the memory 210 through the communication interface 230, instead of the non-transitory computer-readable record medium. For example, the software components may be loaded to the memory 210 of the computer apparatus 200 based on a computer program installed by files provided over the network 170.

The processor 220 may be configured to process instructions of a computer program by performing basic arithmetic operations, logic operations, and I/O operations. The computer-readable instructions may be provided from the memory 210 or the communication interface 230 to the processor 220. For example, the processor 220 may be configured to execute received instructions in response to the program code stored in the storage device, such as the memory 210.

The communication interface 230 may provide a function for communication between the computer apparatus 200 and other apparatuses, for example, the aforementioned storage devices, over the network 170. For example, the processor 220 of the computer apparatus 200 may transfer a request or an instruction created based on a program code stored in the storage device such as the memory 210, data, file, etc., to the other apparatuses over the network 170 under control of the communication interface 230. Inversely, a signal, an instruction, data, a file, etc., from another apparatus may be received at the computer apparatus 200 through the network 170 and the communication interface 230 of the computer apparatus 200. For example, a signal, an instruction, data, etc., received through the communication interface 230 may be transferred to the processor 220 or the memory 210, and a file, etc., may be stored in a storage medium, for example, the permanent storage device, further includable in the computer apparatus 200.

The I/O interface 240 may be a device used for interface with an I/O device 250 (e.g., an input device and/or an output device). For example, an input device may include a device, such as a microphone, a keyboard, a mouse, etc., and an output device may include a device, such as a display, a speaker, etc. As another example, the I/O interface 240 may be a device for interface with an apparatus in which an input function and an output function are integrated into a single function, such as a touchscreen. At least one I/O device 250 may be configured as a single device with the computer apparatus 200.

According to some example embodiments, the computer apparatus 200 may include a number of components greater than or less than a number of components shown in FIG. 2. However, some components may not be illustrated in detail. For example, the computer apparatus 200 may include at least a portion of the I/O device 250, or may further include other components, for example, a transceiver, a database (DB), and the like.

Hereinafter, some example embodiments of a method and system for reward on a cryptocurrency exchange are described.

Figure 3:
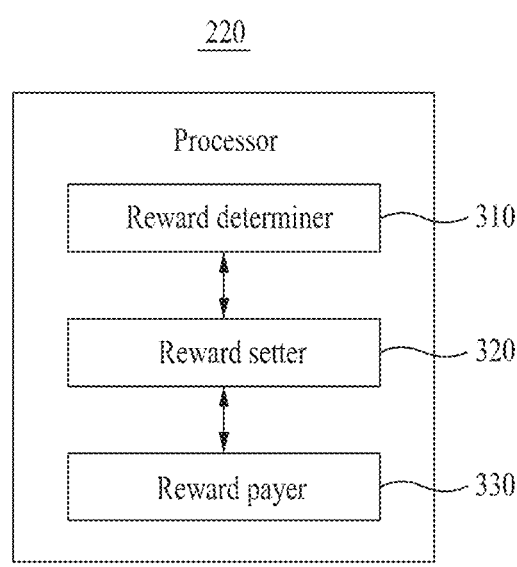
FIG. 3 is a diagram illustrating an example of a processor of a computer apparatus according to some example embodiments.
Figure 4:
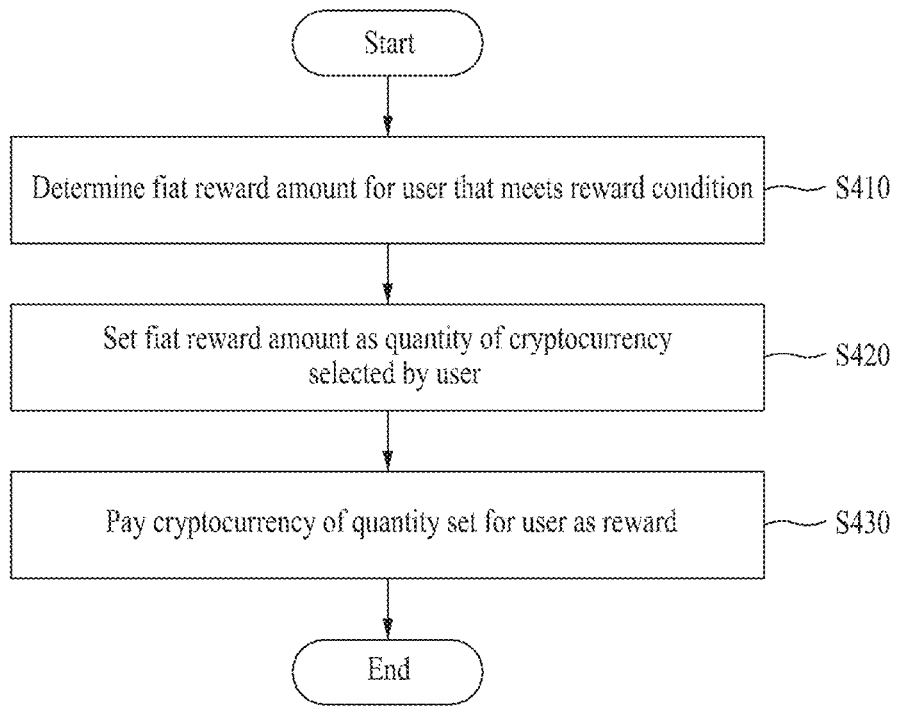
FIG. 4 is a flowchart illustrating an example of a method performed by a computer apparatus according to some example embodiments.

FIG. 3 illustrates an example of a processor of a computer apparatus according to some example embodiments, and FIG. 4 is a flowchart illustrating an example of a cryptocurrency reward method performed by a computer apparatus according to some example embodiments.

The computer apparatus 200, according to some example embodiments, serves as a platform that provides a cryptocurrency trading service. A cryptocurrency reward system may be configured in the computer apparatus 200. The computer apparatus 200 may provide the cryptocurrency trading service through connection to a website/mobile site related to the computer apparatus 200, or an exclusive application installed on the electronic devices 110, 120, 130, and/or 140, with respect to the plurality of electronic devices 110, 120, 130, and/or 140. According to some example embodiments, the cryptocurrency trading service may be implemented using the server 150 and/or 160, and the users of the cryptocurrency trading service may interact with the cryptocurrency trading service via the network 170 using the plurality of electronic devices 110, 120, 130, and/or 140.

Referring to FIG. 3, to perform the cryptocurrency reward method of FIG. 4, the processor 220 of the computer apparatus 200 may include a reward determiner 310, a reward setter 320, and/or a reward payer 330 (also referred to herein as components of the processor 220). Depending on some example embodiments, the components of the processor 220 may be selectively included in or excluded from the processor 220. Also, depending on some example embodiments, the components of the processor 220 may be separated or merged as representations of functions of the processor 220.

The processor 220 and the components of the processor 220 may control the computer apparatus 200 to perform operations S410 to S430 included in the cryptocurrency reward method of FIG. 4. For example, the processor 220 and the components of the processor 220 may be configured to execute an instruction according to a code of at least one program and a code of an OS included in the memory 210.

Here, the components of the processor 220 may be representations of different functions performed by the processor 220 in response to an instruction provided from the program code stored in the computer apparatus 200 (e.g., in the memory 210). For example, the reward determiner 310 may be used as a representation of a function of the processor 220 that controls the computer apparatus 200 to process a transfer transaction in response to the instruction.

The processor 220 may read an instruction from the memory 210 to which instructions associated with control of the computer apparatus 200 are loaded. In this case, the read instruction may include an instruction for controlling the processor 220 to perform the following operations S410 to S430.

The following operations S410 to S430 may be performed in order different from order illustrated in FIG. 4 and a portion of operations S410 to S430 may be omitted. Alternatively, an additional process may be further included.

Referring to FIG. 4, in operation S410, the reward determiner 310 may determine a reward amount based on a fiat currency (hereinafter, a fiat reward amount) for a user that meets a predetermined (or, alternatively, desired) reward condition by using a cryptocurrency trading service (e.g., the reward amount may be an amount of the fiat currency). For example, the reward determiner 310 may determine a fiat reward amount for a user that meets a preset or alternatively, given condition through investment in a cryptocurrency or a participation in an event. For example, the reward determiner 310 may determine the fiat reward amount to a fixed limit (e.g., an upper and/or lower threshold) according to the reward condition. As another example, the reward determiner 310 may determine the fiat reward amount based on a user history for the cryptocurrency trading service, for example, a service use count or frequency, a service use scale (an investment amount), a service type (a cryptocurrency purchase, release of a new loan, etc.), and the like. Here, the reward determiner 310 may deduct the fiat reward amount of the set limit within a budget (reward balance) set for reward and may preserve and maintain the same as a reward value for the user.

In operation S420, the reward setter 320 may set the fiat reward amount of the user that meets the reward condition as a quantity of a cryptocurrency (hereinafter, a preferred coin) selected by the corresponding user. The reward setter 320 may set the preferred coin (e.g., at least one selected cryptocurrency) through a selection of the user from among a plurality of tradable cryptocurrencies, and then may set a fiat reward amount of the corresponding user as a quantity corresponding to the preferred coin (as used herein, the term prefer may refer to a user selection and does not indicate a preference among some example embodiments). Here, the reward setter 320 may set the fiat reward amount as a quantity of the preferred coin based on a market price at a point in time at which the user requests a reward payment. According to some example embodiments, the fiat reward amount may indicate funds (e.g., a fiat currency amount, such as that issued by a government and/or central bank, points, tokens, coins, etc.) that may be realized in the future but are not maintained in a wallet/account at the time the fiat reward amount is determined in operation S410 or set in operation S420. According to some example embodiments, the fiat reward amount may be a fiat currency amount held in a wallet/account at the cryptocurrency trading service for later conversion into a cryptocurrency.

For example, the reward setter 320 may receive a selection of a single cryptocurrency among the plurality of cryptocurrencies as a preferred coin of the user. Here, the reward setter 320 may set the fiat reward amount of the user as a quantity 100% allocated in the preferred coin selected by the user. As another example, the reward setter 320 may receive a selection of at least two cryptocurrencies among the plurality of cryptocurrencies as preferred coins. When at least two preferred coins are selected, the reward setter 320 may adjust a reward ratio for each preferred coin through an equal division or a user setting. For example, the user may select BTC and ETH as the preferred coins and may directly select and adjust a reward ratio for each preferred coin, such as BTC 60% and ETH 40%.

Depending on some example embodiments, in the case of receiving a selection of at least two preferred coins from the user, the reward setter 320 may automatically adjust a reward ratio for each preferred coin based on an internal standard. For example, the reward setter 320 may adjust a reward ratio for each preferred coin based on a bug rate according to a cryptocurrency price fluctuation. Here, the bug rate refers to one of several indicators that represent a risk of cryptocurrency. For example, if there is a price fluctuation above a standard compared to (e.g., within) a reference time (e.g., a reference time period), trading for the cryptocurrency may be in the bug state representing that trading is temporarily suspended. The reward setter 320 may exclude, from a reward method, a preferred coin in which a bug rate (or bug state) occurs a desired number of times or more per unit time and/or may increase a reward ratio of a preferred coin with a lower risk. As another example, the reward setter 320 may adjust a reward ratio for each preferred coin based on a quantity currently held in the cryptocurrency exchange, that is, a current reward balance status. The reward setter 320 may adjust a reward ratio for a preferred coin with a larger balance to increase (e.g., increase the reward ratio for the preferred coin having the larger balance in the cryptocurrency exchange such that the percentage of the reward provided in the preferred coin having the larger balance is higher than that of another preferred coin) by checking the balance for each cryptocurrency (e.g., in a cryptocurrency wallet/account of the user, across the cryptocurrency wallets/accounts of all users associated with the cryptocurrency exchange, etc.). That is, a priority of a reward ratio for a preferred coin with a higher balance may increase according to the current reward balance status.

In operation S430, the reward payer 330 may pay a cryptocurrency of the quantity set for the corresponding user to an account of the user that meets the reward condition. According to some example embodiments, the reward payer 330 may transfer the cryptocurrency corresponding to the quantity set for the corresponding user to the account of the user. Therefore, the reward payer 330 may provide a reward for the user in the cryptocurrency exchange using a user-desired cryptocurrency. Here, when the cryptocurrency quantity set for the user is present in a reward balance (e.g., a reward account of the cryptocurrency exchange), the reward payer 330 may pay the cryptocurrency of the corresponding quantity from the reward balance to an account of the user. Meanwhile, when the cryptocurrency quantity set for the user is insufficient in the reward balance, the reward payer 330 may place the cryptocurrency of insufficient quantity (e.g., the difference between the cryptocurrency quantity set for the user and the amount present in the reward balance) with (e.g., using and/or through) a liquidity provider (LP) and may charge the reward balance. When ordering the cryptocurrency from the LP, it may be advantageous to aggregate quantity of a plurality of rewards and place a bulk order. For example, when the reward balance is insufficient, the reward payer 330 may aggregate and order a reward quantity set for a unit time at an interval of the unit time. For example, when a first user A selects BTC and XRP, a second user B selects BTC and ETH, a third user C selects BTC, XRP, and ETH, and a fourth user D selects XRP, as the preferred coin, the reward payer 330 may aggregate and order a quantity of each preferred coin according to a selection from each of the first to fourth users A, B, C, and D. In this example, the reward payer 330 may aggregate the BTC orders for the first user A, the second user B and the third user C (e.g., aggregated award amount) and place a bulk order for the cryptocurrency BTC sufficient to satisfy the reward balance of the cryptocurrency BTC for all of the first to third users A, B and C. Here, the reward payer 330 may set an LP order in order in which bulk order is advantageous based on a reward adjustment option according to the preferred coin.

In the existing method, the cryptocurrency exchange presets or sets a cryptocurrency that is a fixed reward method (e.g., a fixed cryptocurrency to be provided as a reward), and issues or purchases the corresponding cryptocurrency and then pays the user as a reward.

In an airdrop method, the cryptocurrency exchange pays a newly issued cryptocurrency or an existing cryptocurrency free of charge to a user that holds a specific cryptocurrency based on an investment ratio.

Also, a transaction volume-based reward method pays a certain amount of cryptocurrency as a reward compared to a transaction volume purchased by the user.

However, in the existing method, the cryptocurrency exchange issues, or purchases, and holds a cryptocurrency to be paid as a reward and then pays a user that meets a reward condition. Therefore, the risk of price fluctuation is present due to a difference between a cryptocurrency holding timing and a reward payment timing.

Therefore, some example embodiments provide a reward method that may minimize or reduce a price fluctuation risk while maintaining a reward value for a user.

Figure 5:
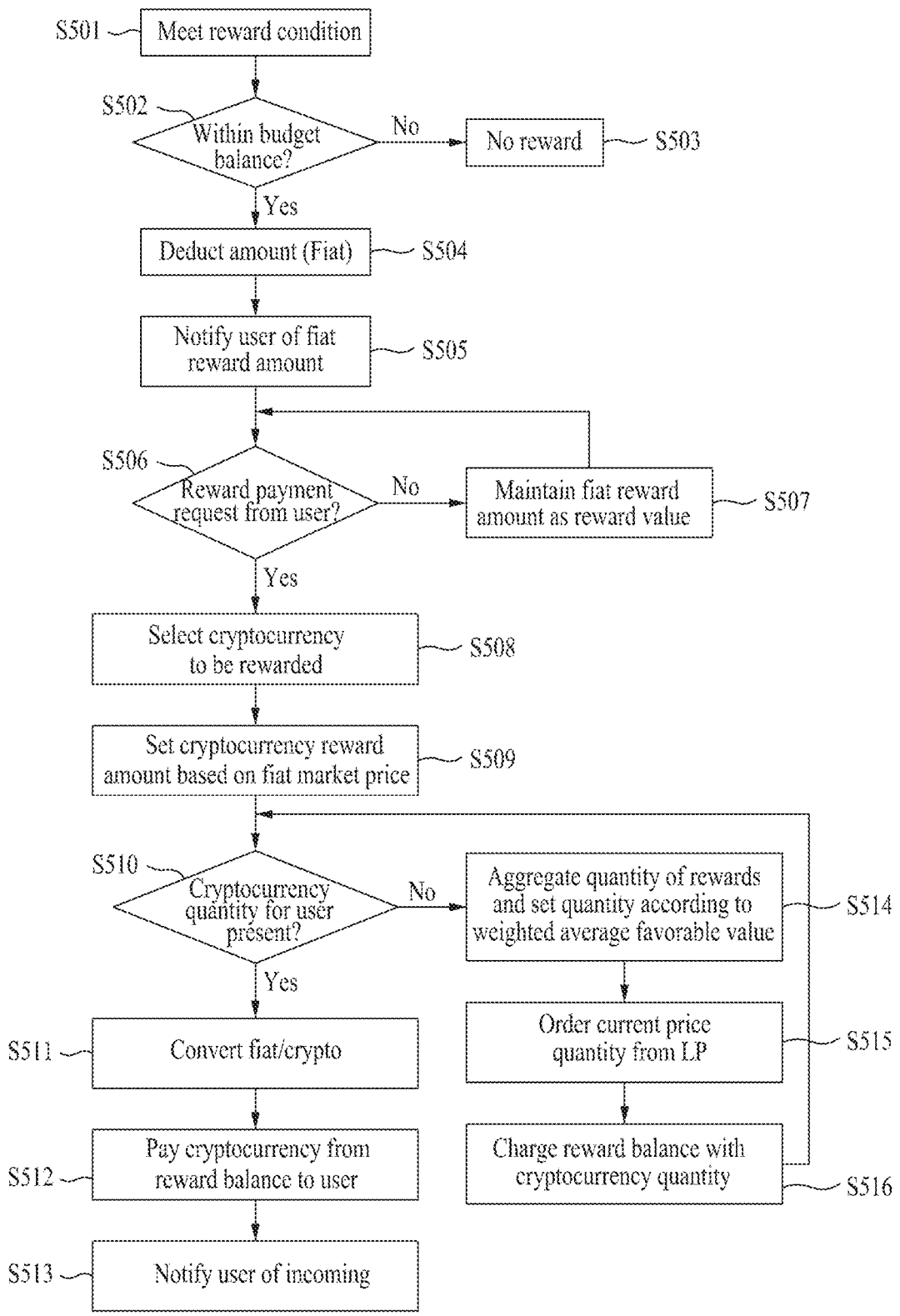
FIG. 5 is a flowchart illustrating an example of an overall process for a cryptocurrency reward according to some example embodiments.

FIG. 5 is a flowchart illustrating an example of an overall process for a cryptocurrency reward according to some example embodiments.

Referring to FIG. 5, when a user meets a reward condition in operation S501, the processor 220 may verify whether a budget set for reward is present in operation S502. According to some example embodiments, the budget for reward may be set or established, or not be set or established, by the cryptocurrency exchange.

When the budget for the reward is absent, the processor 220 may not pay the reward to the corresponding user in operation S503.

When the budget for the reward is present, the processor 220 may deduct a fiat reward amount according to the reward condition in operation S504. At a point in time at which the user meets the reward condition, the processor 220 may preserve the fiat reward amount as a reward value for the user.

In operation S505, the processor 220 may notify the user of the fiat reward amount as a reward notification for the user.

In operation S506, the processor 220 may verify whether a reward payment request is received from the user.

When the reward payment request is not received from the user, the processor 220 may maintain the fiat reward amount that is being preserved as the reward value for the user in operation S507.

When the reward payment request is received from the user, the processor 220 may request the user to select a cryptocurrency to be rewarded in and may receive a selection of at least one cryptocurrency as a preferred coin of the user in operation S508.

When the selection from the user of the preferred coin is completed, the processor 220 may set the fiat reward amount as a quantity of the preferred coin based on a market price at a point in time at which the user requests the reward payment in operation S509.

In operation S510, the processor 220 may verify whether the cryptocurrency quantity set for the user is present in a reward balance.

When the cryptocurrency quantity set for the user is present in the reward balance, the processor 220 may convert the fiat reward amount into the preferred coin in operation S511 and may pay the preferred coin of a quantity corresponding to the fiat reward amount from the reward balance to an account of the user in operation S512.

As the reward payment is completed, the processor 220 may provide a notification indicating the preferred coin is incoming as a reward notification for the user in operation S513.

Meanwhile, when the cryptocurrency quantity set for the user is insufficient in the reward balance, the processor 220 may aggregate a quantity of a plurality of rewards and may order the corresponding quantity from an LP in operations S514 and S515.

The processor 220 may order the current price quantity by aggregating a reward quantity set for each user during a unit time at an interval of the unit time and then setting the quantity according to a weighted average favorable value.

In operation S516, the processor 220 may charge the reward balance with the cryptocurrency quantity through the cryptocurrency order from the LP.

When the cryptocurrency charging is completed, the processor 220 may perform a reward payment process through operations S510 to S513.

Therefore, the processor 220 may provide a reward to the user with a preferred coin desired by the user.

Figure 6:
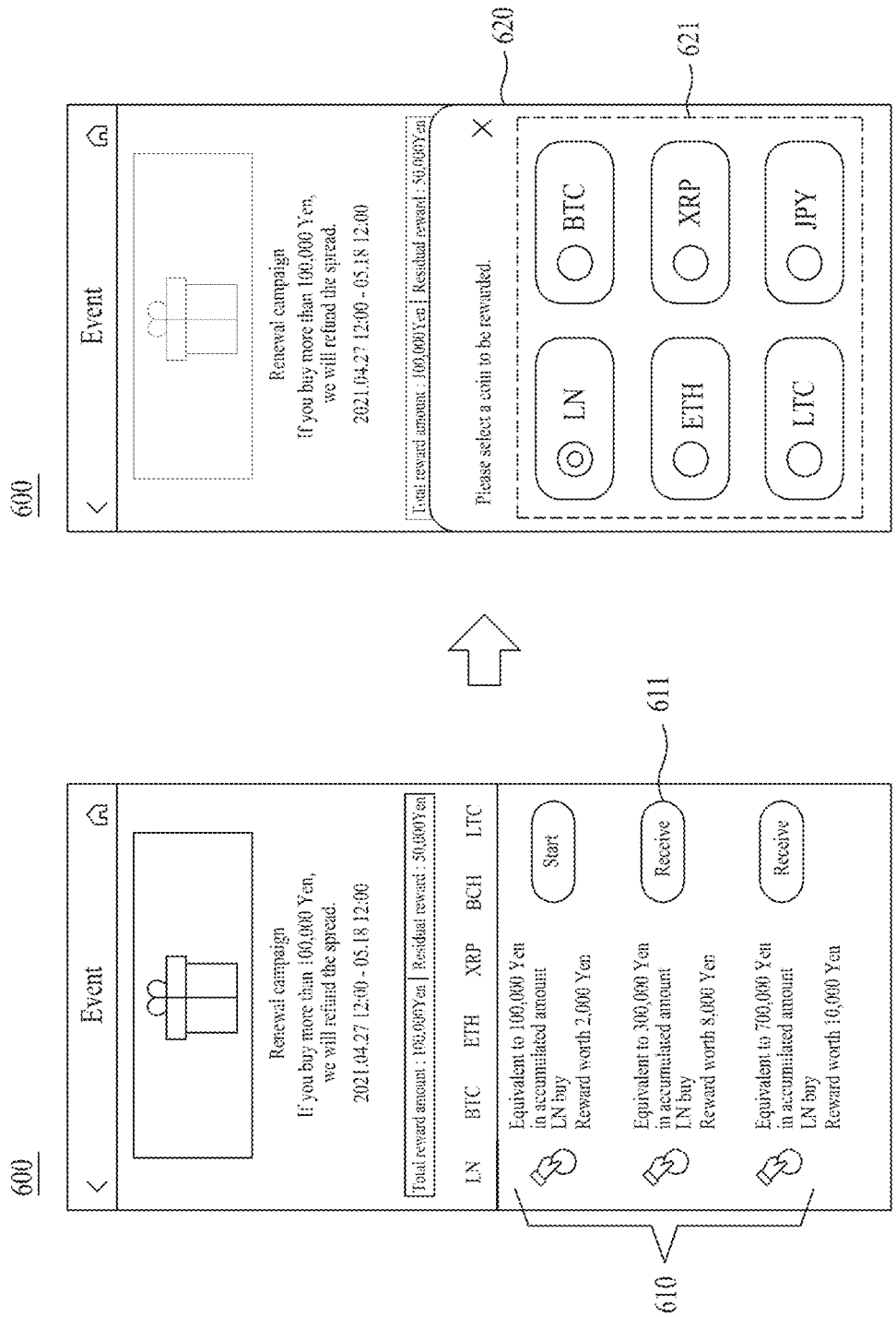
FIGS. 6 to 8 illustrate examples of a user interface screen related to a cryptocurrency reward according to some example embodiments.
Figure 7:
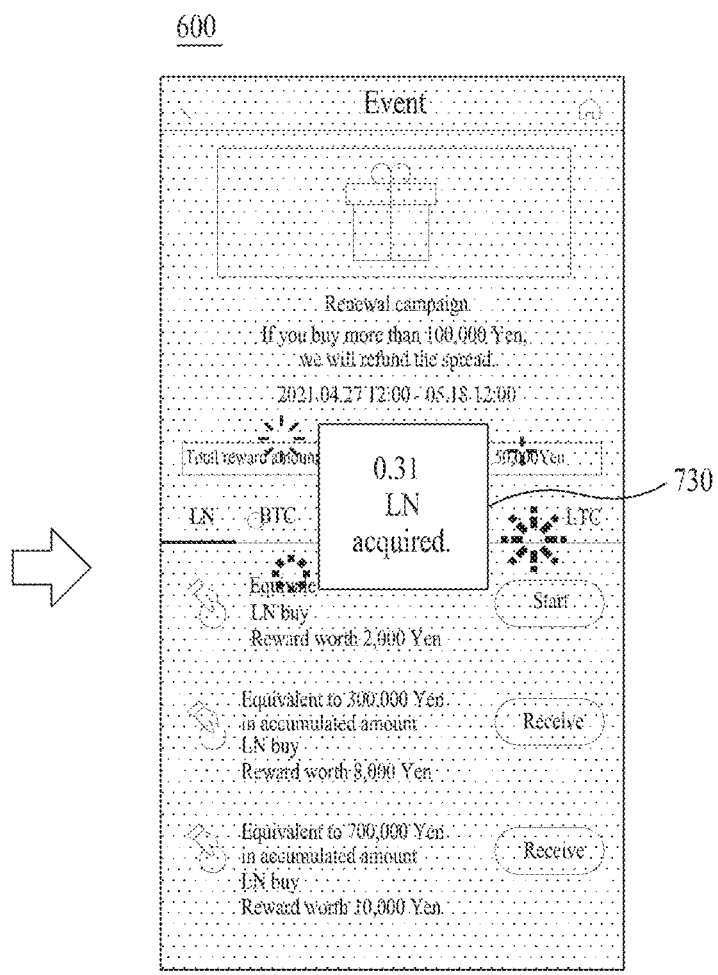
Figure 8:
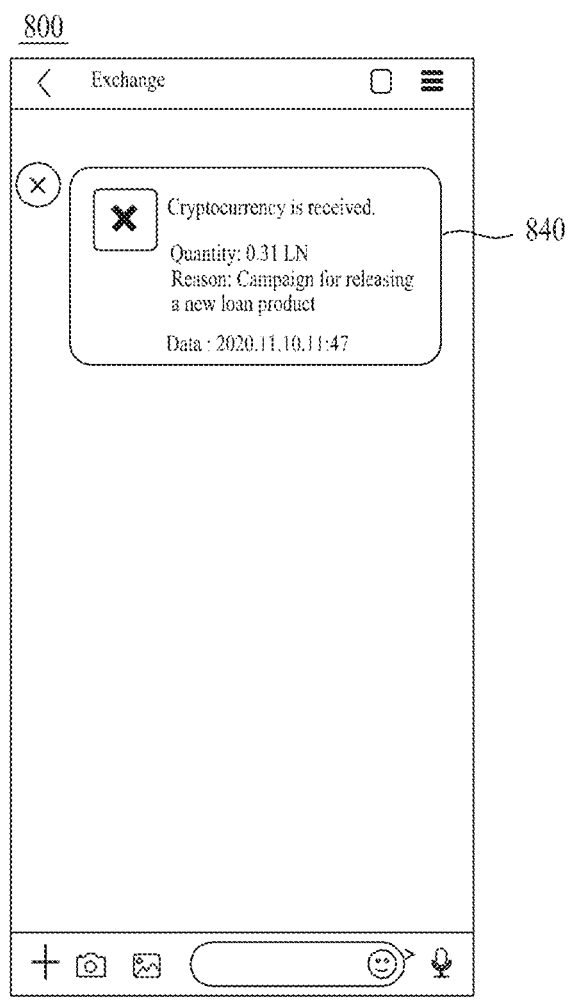

FIGS. 6 to 8 illustrate examples of a user interface screen related to a cryptocurrency reward according to some example embodiments.

FIG. 6 illustrates an example of an event service screen 600 for a reward in a cryptocurrency exchange.

Referring to FIG. 6, an event list 610 including an event in which a user may participate, and/or an event in which the user has already participated, may be displayed on the event service screen 600.

Based on the event in which the user has participated, the event list 610 may include a notice about a fiat reward amount and may include a "Receive" menu 611 for requesting a reward payment. According to some example embodiments, the "Receive" menu 611 may be an interface element, icon, etc.

In response to the user selecting the "Receive" menu 611, the processor 220 may display a coin selection screen 620 for selecting a preferred coin. According to some example embodiments, the coin selection screen 620 may be displayed above at least a portion of the event service screen 600 and/or the event list 610, e.g., as a pop-up screen.

A currency list 621 of currencies available as a reward method may be displayed on the coin selection screen 620. Here, one or more cryptocurrencies and/or a fiat currencies tradable in the cryptocurrency exchange may be included in the currency list 621.

When the user selects the preferred coin to be received as the reward from the currency list 621 displayed on the coin selection screen 620, the processor 220 may automatically calculate a quantity of the preferred coin based on a fiat market price assigned to the user.

When the quantity of the preferred coin is present in a reward balance, the processor 220 may immediately or promptly proceed with a reward payment. When the quantity is absent from the reward balance, the processor 220 may proceed with the reward payment after aggregating a quantity of a plurality of rewards and then charging the reward balance through a bulk order.

When the user selects the fiat currency rather than the cryptocurrency as the preferred coin, the processor 220 may pay the fiat reward amount assigned to the corresponding user as is (e.g., in an amount of fiat currency, such as that issued by a government and/or central bank).

Referring to FIG. 7, when the reward payment to the user is completed, the processor 220 may provide a reward payment notification 730 notifying the user of incoming of the preferred coin according to the reward. According to some example embodiments, the reward payment notification 730 may be displayed above at least a portion of the event service screen 600 and/or the event list 610, e.g., as a pop-up screen.

Referring to FIG. 8, depending on some example embodiments, the processor 220 may provide a reward payment notification 840 indicating that a preferred coin is incoming according to a reward through a chatroom 800 in which an account of a cryptocurrency trading service participates, in conjunction with a messenger. According to some example embodiments, the reward payment notification 840 may be formatted as a chat message appearing in the chatroom 800 in association with an identifier of the cryptocurrency trading service corresponding to a messenger service.

Therefore, in some example embodiments, a cryptocurrency exchange may determine and maintain a reward value based on a fiat at a point in time at which a user meets a reward condition and may pay a preset or alternatively, given fiat reward amount as a user-desired cryptocurrency at a point in time at which the user requests a reward payment.

According to some example embodiments, by initially determining a fiat reward amount for a user and then, in response to a payment request from the user, converting the fiat reward amount into a cryptocurrency and paying the same, it is possible to minimize or reduce a risk according to a cryptocurrency price fluctuation while maintaining a reward value.

Also, according to some example embodiments, it is possible to provide a reward in a mutually satisfactory and reasonable form by paying a reward using a cryptocurrency desired by a user among a plurality of cryptocurrencies traded in a cryptocurrency exchange.

Conventional apparatuses for providing a cryptocurrency reward obtain (e.g., order, purchase, etc.) a fixed type of cryptocurrency of a sufficient amount to satisfy all rewards to be provided to users. This obtained cryptocurrency is maintained in an account by the conventional apparatuses and later transferred to the users as a reward at an appropriate time. By maintaining the cryptocurrency in an account, the conventional apparatuses assume excessive risk of fluctuation in the cryptocurrency price. Such price fluctuation risk may be higher for cryptocurrencies than for fiat currencies. Also, by limiting the reward to a fixed type of cryptocurrency for all users, the conventional apparatuses inflict excessive transaction costs (e.g., transaction fees, delay, etc.) on the users as the users convert the fixed type of cryptocurrency into a type of cryptocurrency desired by the users.

However, according to some example embodiments, improved apparatuses for providing a cryptocurrency reward are provided. For example, the improved apparatuses may enable user selection of a desired cryptocurrency to be received as a reward. Accordingly, the improved apparatuses overcome the deficiencies of the conventional apparatuses to at least reduce transaction costs (e.g., transaction fees, delay, etc.) on the users.

Also, the improved apparatuses may maintain an account including a user's reward in a fiat currency (e.g., a user-specific account/wallet, a general account, etc.), and convert the fiat currency to the desired cryptocurrency at a market rate when the user indicates readiness to receive the reward. With this approach, the improved apparatuses may maintain a smaller amount of cryptocurrency (or none of the cryptocurrency) and order a remaining (and/or sufficient) amount of the cryptocurrency when fulfilling the user's reward. Accordingly, the improved computer apparatuses reduce the amount of cryptocurrency held over time, and thus, overcome the deficiencies of the conventional apparatuses to at least reduce the risk of price fluctuation in the cryptocurrency.

The systems or apparatuses described above may be implemented using hardware components, software components, and/or a combination thereof. For example, the apparatuses and the components described herein may be implemented using one or more general-purpose or special purpose computers, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be embodied permanently or temporarily in any type of machine, component, physical equipment, virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable storage mediums.

The methods according to some example embodiments may be configured in a form of program instructions performed through various computer devices and recorded in non-transitory computer-readable media. The media may continuously store computer-executable programs or may temporarily store the same for execution or download. Also, the media may be various types of recording devices or storage devices in a form in which one or a plurality of hardware components are combined. Without being limited to media directly connected to a computer system, the media may be distributed over the network. Examples of the media include magnetic media such as hard disks, floppy disks, and magnetic tapes; optical media such as CD-ROM and DVDs; magneto-optical media such as floptical disks; and hardware devices that are specially configured to store and perform program instructions, such as ROM, RAM, flash memory, and the like. Examples of other media may include recording media and storage media managed by an app store that distributes applications or a site, a server, and the like that supplies and distributes other various types of software.

While this disclosure includes some example embodiments, it will be apparent to one of ordinary skill in the art that various alterations and modifications in form and details may be made without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents. Therefore, other implementations and equivalents are within the scope of the following claims.

What is claimed is:

1. A cryptocurrency reward method performed by a computer apparatus, the computer apparatus including at least one processor configured to execute computer-readable instructions stored in a memory, the cryptocurrency reward method comprising:
   determining, by the at least one processor, a first reward amount for a user that meets a first reward condition, the first reward condition being based on use of a cryptocurrency exchange by the user, and the first reward amount being in a fiat currency;
   maintaining, by the at least one processor, the first reward amount in the fiat currency at a first timing;
   causing, by the at least one processor, display of a first screen including a list of events, the list of events including a plurality of entries vertically spaced apart on the first screen, each respective entry among the plurality of entries corresponding to a different event, each respective entry among the plurality of entries including a corresponding reward condition, a corresponding reward amount and a corresponding selectable interface, the corresponding selectable interface including an associated graphical element, and a first entry among the plurality of entries including the first reward condition, the first reward amount and a first selectable interface
   causing, by the at least one processor, display of a second screen in response to receiving a first selection by the user of the first selectable interface, the second screen being displayed as a pop-up over at least a portion of the list of events, a plurality of graphical elements being spaced apart on the second screen, each of the plurality of graphical elements including a respective selectable interface, and each of the plurality of graphical elements including a respective label identifying a different cryptocurrency;
   setting, by the at least one processor, at least two cryptocurrencies as at least two selected cryptocurrencies based on a second selection by the user and a third selection by the user, the second selection being of the respective selectable interface of each of at least two graphical elements among the plurality of graphical elements, the at least two graphical elements respectively including labels identifying the at least two selected cryptocurrencies, the third selection including at least one ratio between the at least two selected cryptocurrencies, and the second selection of the user being received at a second timing after the first timing;
   converting, by the at least one processor, the first reward amount into the at least two selected cryptocurrencies at corresponding first market prices to obtain at least two converted reward amounts, the corresponding first market price representing respective prices of the at least two selected cryptocurrencies in the fiat currency at the second timing, the corresponding first market price being respectively different from a second market prices, the second market prices respectively representing the prices of the at least two selected cryptocurrencies in the fiat currency at the first timing, at least one of the corresponding first market prices being respectively less than at least one of the second market prices, and the converting including converting the first reward amount into the at least two selected cryptocurrencies according to the at least one ratio;
   determining, by the at least one processor, whether a reward balance includes the at least two converted reward amounts;
   aggregating, by the at least one processor, a plurality of rewards corresponding to a plurality of users in response to determining that the reward balance does not include the at least two converted reward amounts to obtain an aggregated reward, the plurality of rewards including the at least two converted reward amounts, and the plurality of users including the user;
   ordering, by the at least one processor, the aggregated reward from a liquidity provider according to a first time interval;
   transferring, by the at least one processor, the at least two converted reward amounts to an account of the user based on the ordering; and
   causing, by the at least one processor, display of a third screen including a notification that the at least two converted reward amounts have been transferred, the causing the display of the third screen being performed after the transferring, and the third screen being displayed as a pop-up over at least a portion of the list of events.

2. The cryptocurrency reward method of claim 1, further comprising:
   setting, by the at least one processor, an order sequence of the aggregated reward based on a reward adjustment option and the at least two selected cryptocurrencies.

3. The cryptocurrency reward method of claim 1, wherein a second entry among the plurality of entries includes a second reward condition, a second reward amount and a second selectable interface;

the at least two cryptocurrencies are at least two first cryptocurrencies;
the at least two selected cryptocurrencies are at least two first selected cryptocurrencies;
the at least one ratio is at least one first ratio;
the at least two converted reward amounts are at least two first converted reward amounts; and
the method further comprises:
causing, by the at least one processor, display of the second screen in response to receiving a fourth selection by the user of the second selectable interface,
setting, by the at least one processor, at least two second cryptocurrencies as at least two second selected cryptocurrencies based on a fifth selection by the user, the fifth selection being of the respective selectable interface of each of at least two graphical elements among the plurality of graphical elements, the at least two graphical elements respectively including a labels identifying the at least two second selected cryptocurrencies, and the setting of the at least two second cryptocurrencies as the at least two second selected cryptocurrencies including adjusting at least one second ratio for each of the at least two second selected cryptocurrencies based on a cryptocurrency-related internal standard,
converting, by the at least one processor, the second reward amount into the at least two second selected cryptocurrencies at corresponding first market prices to obtain at least two second converted reward amounts, the converting the second reward amount into the at least two second selected cryptocurrencies including converting the second reward amount into the at least two selected cryptocurrencies according to the at least one second ratio, and
transferring, by the at least one processor, the at least two second converted reward amounts to the account of the user.

4. The cryptocurrency reward method of claim 3, wherein the cryptocurrency-related internal standard includes a bug rate corresponding to a cryptocurrency price fluctuation.

5. The cryptocurrency reward method of claim 3, wherein the at least two second selected cryptocurrencies include a first selected cryptocurrency; and
the adjusting comprises adjusting the at least one second ratio for the first selected cryptocurrency to zero based on a price fluctuation in the first selected cryptocurrency occurring a number of times or more within a reference time period.

6. The cryptocurrency reward method of claim 3, wherein the adjusting comprises adjusting the at least one second ratio for each of the at least two second selected cryptocurrencies based on a balance held in the cryptocurrency exchange.

7. The cryptocurrency reward method of claim 1, wherein the third screen is a chatroom associated with a messenger.

8. A non-transitory computer-readable record medium storing instructions that, when executed by at least one processor included in a computer apparatus, cause the computer apparatus to perform the cryptocurrency reward method of claim 1.

9. A computer apparatus comprising:
at least one processor configured to execute computer-readable instructions stored in a memory to cause the computer apparatus to
determine a first reward amount for a user that meets a first reward condition, the first reward condition being based on use of a cryptocurrency exchange by the user, and the first reward amount being in a fiat currency,
maintain the first reward amount in the fiat currency at a first timing,
cause display of a first screen including a list of events, the list of events including a plurality of entries vertically spaced apart on the first screen, each respective entry among the plurality of entries corresponding to a different event, each respective entry among the plurality of entries including a corresponding reward condition, a corresponding reward amount and a corresponding selectable interface, the corresponding selectable interface including an associated graphical element, and a first entry among the plurality of entries including the first reward condition, the first reward amount and a first selectable interface,
cause display of a second screen in response to receiving a first selection by the user of the first selectable interface, the second screen being displayed as a pop-up over at least a portion of the list of events, a plurality of graphical elements being spaced apart on the second screen, each of the plurality of graphical elements including a respective selectable interface, and each of the plurality of graphical elements including a respective label identifying a different cryptocurrency,
set at least two cryptocurrencies as at least two selected cryptocurrencies based on a second selection by the user and a third selection by the user, the second selection being of the respective selectable interface of each of at least two graphical elements among the plurality of graphical elements, the at least two graphical elements respectively including labels identifying the at least two selected cryptocurrencies, the third selection including at least one ratio between the at least two selected cryptocurrencies, and the second selection of the user being received at a second timing after the first timing,
convert the first reward amount into the at least two selected cryptocurrencies at corresponding first market prices to obtain at least two converted reward amounts, the corresponding first market prices representing respective prices of the at least two selected cryptocurrencies in the fiat currency at the second timing, the corresponding first market prices being respectively different from a second market prices, the second market prices respectively representing the prices of the at least two selected cryptocurrencies in the fiat currency at the first timing, at least one of the corresponding first market prices being respectively less than at least one of the second market prices, and the conversion including converting the first reward amount into the at least two selected cryptocurrencies according to the at least one ratio,
determine whether a reward balance includes the at least two converted reward amounts,
aggregate a plurality of rewards corresponding to a plurality of users in response to determining that the reward balance does not include the at least two converted reward amounts to obtain an aggregated reward, the plurality of rewards including the at least two converted reward amounts, and the plurality of users including the user, order the aggregated reward from a liquidity provider according to a first time interval, transfer the at least two converted reward amounts to an account of the user based on the order of the aggregated reward, and cause display of a third screen including a notification that the at least two converted reward amounts have been transferred, the causation of the display of the third screen being performed after the transfer of the at least two converted reward amounts, and the third screen being displayed as a pop-up over at least a portion of the list of events.

10. The computer apparatus of claim 9, wherein the at least one processor is configured to execute computer-readable instructions to cause the computer apparatus to set an order sequence of the aggregated reward based on a reward adjustment option and the at least two selected cryptocurrencies.

11. The computer apparatus of claim 9, wherein
a second entry among the plurality of entries includes a second reward condition, a second reward amount and a second selectable interface;
the at least two cryptocurrencies are at least two first cryptocurrencies;
the at least two selected cryptocurrencies are at least two first selected cryptocurrencies;
the at least one ratio is at least one first ratio;
the at least two converted reward amounts are at least two first converted reward amounts; and
the at least one processor is configured to execute computer-readable instructions to cause the computer apparatus to
cause display of the second screen in response to receiving a fourth selection by the user of the second selectable interface,
set at least two second cryptocurrencies as at least two second selected cryptocurrencies based on a fifth selection by the user, the fifth selection being of the respective selectable interface of each of at least two graphical elements among the plurality of graphical elements, the at least two graphical elements respectively including a labels identifying the at least two second selected cryptocurrencies, the at least two second cryptocurrencies being set at the at least two second selected cryptocurrencies including adjusting at least one second ratio for each of the at least two second selected cryptocurrencies based on a cryptocurrency-related internal standard,
convert the second reward amount into the at least two second selected cryptocurrencies at corresponding first market prices to obtain at least two second converted reward amounts, the conversion of the second reward amount into the at least two second selected cryptocurrencies including converting the second reward amount into the at least two selected cryptocurrencies according to the at least one second ratio, and
transfer the at least two second converted reward amounts to the account of the user.

12. The computer apparatus of claim 11, wherein the cryptocurrency-related internal standard includes a bug rate corresponding to a cryptocurrency price fluctuation.

13. The computer apparatus of claim 11, wherein
the at least two second selected cryptocurrencies include a first selected cryptocurrency; and
the at least one processor is configured to execute computer-readable instructions to cause the computer apparatus to adjust the at least one second ratio for the first selected cryptocurrency to zero based on a price fluctuation in the first selected cryptocurrency occurring a number of times or more within a reference time period.

14. The computer apparatus of claim 11, wherein the at least one processor is configured to execute computer-readable instructions to cause the computer apparatus to adjust the at least one second ratio for each of the at least two second selected cryptocurrencies based on a balance held in the cryptocurrency exchange.

* * * * *